ELECTRIC CONTROL DEVICE WITH INTERLOCKING MEANS

Filed Sept. 29, 1965 3 Sheets-Sheet 1

ELECTRIC CONTROL DEVICE WITH INTERLOCKING MEANS

Filed Sept. 29, 1965 3 Sheets-Sheet 2

March 28, 1967 J. E. JOHNSON 3,311,720

ELECTRIC CONTROL DEVICE WITH INTERLOCKING MEANS

Filed Sept. 29, 1965 3 Sheets-Sheet 3

United States Patent Office 3,311,720

Patented Mar. 28, 1967

3,311,720
ELECTRIC CONTROL DEVICE WITH INTERLOCKING MEANS

James E. Johnson, Fairport, N.Y., assignor to Westinghouse Electric Corporation, Pittsburgh, Pa., a corporation of Pennsylvania Filed Sept. 29, 1965, Ser. No. 491,269
17 Claims. (Cl. 200—50)

This invention relates generally to enclosed electric control devices and more particularly to circuit interrupting structures constructed to cooperate with the openable cover structure of an enclosure.

At certain installations of enclosed electric control devices it is desirable to provide a circuit interrupting structure comprising an externally accessible operating handle that is continuously connected to operate an enclosed circuit interrupter regardless of the position of the enclosure cover. Thus, the operative connection between the operating handle and the rest of the circuit interrupting structure is not disturbed during opening and closing operations of the enclosure cover. In order to provide a safer installation, it is also desirable to provide interlocking means automatically operable to latch the enclosure cover in the closed position when the circuit interrupting structure is closed and to latch the circuit interrupting structure open when the enclosure cover is opened. For some applications, means are provided for defeating one or both of the latching functions.

Accordingly, an object of this invention is to provide an improved manually operable circuit interrupting structure comprising latch means automatically operable to latch an enclosure cover structure closed when the circuit interrupting structure is in the closed position and to latch the circuit interrupting structure open when the enclosure cover structure is in the open position.

Another object of this invention is to provide an improved circuit interrupting structure in accordance with the immediately preceding object wherein each of the latching functions is manually defeatable.

Another object of this invention is to provide an improved circuit interrupting structure comprising a rectilinearly movable handle member and a single latch member connected to the handle member for compound movement, which latch member is automatically operable to defeatably latch the enclosure cover closed when the circuit interrupting structure is closed and to defeatably latch the circuit interrupting structure open when the enclosure cover is opened.

Conventional switches and circuit breakers that are adapted to be mounted in enclosures do not include the required interlocking features as part of the units. It is possible for a manufacturer of enclosures to mount the various interlocking features within an enclosure to cooperate with a circuit interrupter that may be mounted in the enclosure. It is more desirable, for certain installations, to suply a unitary handle operating attachment that can be mounted on a circuit interrupter to cooperate with an enclosure cover structure in order to provide the required interlocking functions.

Accordingly, another object of this invention is to provide an improved handle operating mechanism that can be mounted as a unit on a circuit breaker or switch for operating the operating handle of the circuit breaker or switch, which mechanism comprises interlocking means cooperable with an enclosure cover structure to automatically latch the cover structure closed when the circuit breaker or switch is closed and to automatically latch the circuit breaker or switch open when the enclosure cover structure is opened.

Another object of this invention is to provide an improved handle operating attachment that can be mounted as a unit on a circuit breaker or switch and that comprises an improved rectilinearly movable operating handle structure for operating the operating handle of the circuit breaker or switch.

Another object of this invention is to provide an improved handle operating attachment that can be mounted on a circuit interrupter and that comprises a rectilinearly movable handle member and a single interlocking member attached to the handle member for compound movement which interlocking member is adapted to cooperate with an enclosure cover structure to defeatably latch the circuit interrupter open when the cover structure is open and to defeatably latch the cover structure closed when the circuit interrupter is closed.

Another object of this invention is to provide an improved handle operating structure with improved means for padlocking the handle in the open and closed positions.

Another object of this invention is to provide an improved handle operating attachment comprising improved defeatable latch means automatically latching the handle in the "off" position when the handle is moved to the "off" position.

Another object of this invention is to provide a handle operating attachment comprising improved latch means automatically latching the handle in the "off" position when the handle is moved to the "off" position, which latch means comprises means for receiving the hasp of a padlock to permit padlocking of the handle in the "off" position.

A general object of this invention is to provide an improved dependable and relatively inexpensive handle operating attachment for circuit interrupters.

The invention, both as to structure and operation, together with additional objects and advantages thereof, will be best understood from the following detailed description when read in conjunction with the accompanying drawings.

Figure 1:
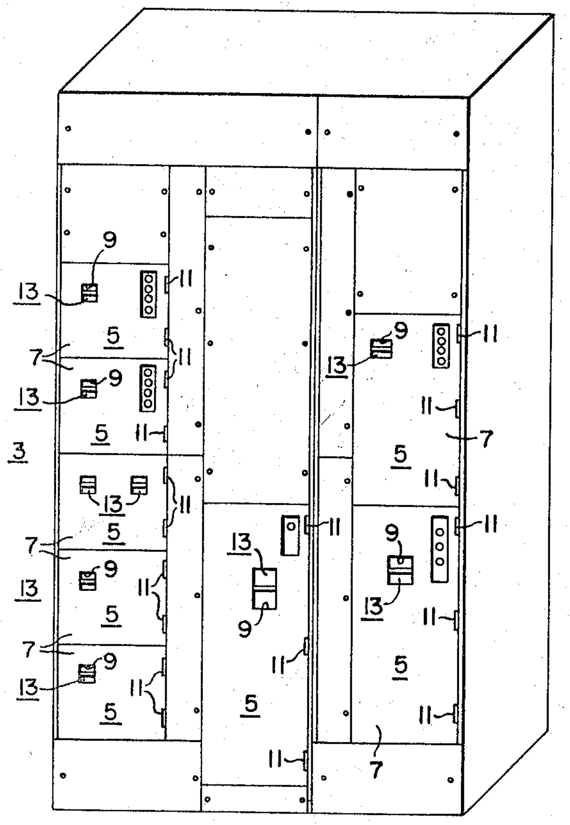
FIGURE 1 is a perspective view of a control center comprising a plurality of circuit interrupting structures that are constructed in accordance with the principles of this invention.

Referring to the drawings, there is disclosed, in FIG 1, a control center 3 comprising a plurality of separate control compartments 5. The control center 3 is more specifically described in the copending patent application of Edmund W. Kuhn et al., Ser. No. 422,850, filed Dec. 31, 1964. Each of the compartments 5 comprises a cover structure 7 having one or more openings 9 therein. The cover structure 7 is supported for opening and closing-movement on the cabinet part of the control structure by means of hinges 11. A separate circuit interrupting structure 13 is supported in each of the compartments 5. Each of the circuit interrupting structures 13 comprises a handle that protrudes through the associated opening 9 in the associated cover structure 7 to be externally accessible for manual operation. Each of the compartments 5 may comprise one or more circuit interrupting structures 13. As is illustrated in FIG. 2, each of the compartments 5 comprises a sheet metal base 17 supporting the associated circuit interrupting structure 13 opposite the associated cover structure 7.

The one circuit interrupting structure 13 and parts associated therewith as disclosed in FIG. 2 will be hereinafter specifically described, it being understood that the other circuit interrupting structures and associated parts may be similarly constructed.

Figure 2:
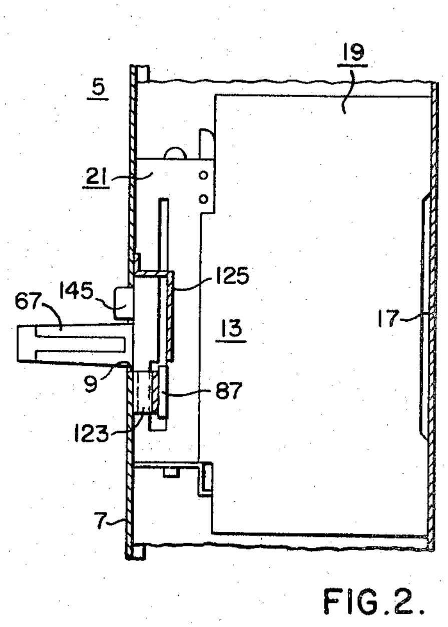
FIG. 2 is a partial sectional view, looking into one of the compartments of the control center shown in FIG. 1, illustrating a circuit interrupting structure constructed in accordance with the principles of this invention.

Referring to FIG. 2, the circuit interrupting structure 13 comprises a circuit interrupter 19 and a handle operating mechanism 21 removably secured to the front cover part of the circuit interrupter 19. The circuit interrupter 19 may be a conventional circuit breaker or switch. As disclosed herein, the circuit interrupter 19 comprises an insulating-housing or molded- case type circuit breaker of the type disclosed in the patent to G. R. Thomas et al., Pat. No. 3,073,925, issued Jan. 15, 1963. Thus, only a schematic illustration and a brief description of the circuit breaker 19 is herein provided.

Figure 3:
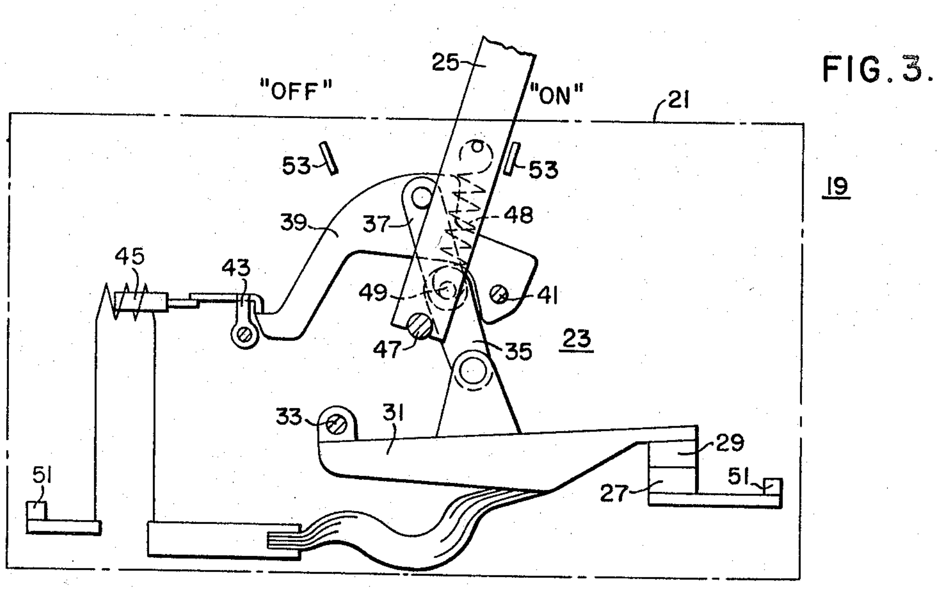
FIG. 3 is a schematic view of the circuit breaker seen in FIG. 2.

Referring to FIG. 3, the circuit breaker 19 comprises a housing 21 of molded insulating material and a circuit breaker mechanism 23 disposed within the housing 21. A manually operable toggle lever or handle 25 protrudes out from the housing 21 through a suitable opening in the front of the housing 21. The handle 25 is an interrupter operating member operable to operate the circuit breaker 19. The circuit breaker mechanism 23 also comprises a stationary contact 27 and a movable contact 29. The movable contact 29 is connected to a contact arm 31 that is pivotally supported in the housing 21 at 33. A toggle comprising a lower toggle link 35 and an upper toggle link 37 operatively connects the contact arm 31 with a trip member or cradle member 39 that is pivotally supported in the housing 21 at 41. The free end of the trip member 39 is latched by means of a latch 43 that is controlled by means of an electromagnetic trip device 45. The interrupter operating member or handle 25 is pivotally supported in the housing 21 on a pivot pin 47. An overcenter spring 48 is connected under tension at one end on the lever 25 and at the other end at the knee pivot 49 of the toggle 35, 37. Suitable terminals 51, disposed at opposite ends of the housing 21, are provided for connecting the trip 45, contact arm 31, and contacts 27, 29 in an electric circuit. The circuit breaker is disclosed in FIG. 3 in the "on" or contact-closed position. In order to open the circuit breaker, the interrupter operating member 25 is moved to the "off" position which movement moves the spring 48 to collapse the toggle 35, 37 thereby moving the contact arm 31 and contact 29 away from the contact 27 to a contact-opened position. Suitable stop means 53 are provided to limit movement of the interrupter operating member 25 in both directions. In order to close the circuit breaker, the interrupter operating member 25 is moved back to the "on" position which movement operates through the overcenter spring 48 to straighten the toggle 35, 37 to move the switch arm 31 to the contact-closed position seen in FIG. 3. Upon the occurrence of an overload current above a predetermined value, the electromagnetic trip 45 is energized to release the latch 43 to thereby release the trip member 39 whereupon the spring 48 operates to rotate the trip member 39 in a clockwise (FIG. 3) direction to effect a change of the line of action of the spring 48 whereupon the spring 48 will collapse the toggle 35, 37 to move the switch arm 31 to the contact-opened position. The circuit breaker is relatched by moving the interrupter operating member 25 to the full "off" position. During this movement, a suitable projection (not shown) on the interrupter operating member 25 engages the trip member 39 and rotates the trip member to the position seen in FIG. 3 where the trip member 39 is automatically latched in a manner well known in the art. The circuit breaker 19 can also comprise a thermal trip that will release the trip member 39 to effect a tripping operation after a time delay upon the occurrence of lesser overload currents in a manner well known in the art.

The handle operating mechanism or attachment 21 (FIGS. 2 and 4–10) comprises a rigid sheet-metal box-like or receptacle-like enclosure support 57. The support 57 comprises a generally planar top part and side wall means, comprising two depending side walls 61 and two depending end walls 63, that extend to form an open bottom. The top part 59 has an opening 65 therein. The handle 67 of the handle member 69 protrudes through the opening 65. The handle member 69 comprises a molded insulating member comprising an internal main body part 71 formed integrally with the external handle 67. The internal main body part 71 is provided with two oppositely disposed notches 75 (FIG. 5) that open outward at opposite sides of the part 71, and two oppositely disposed notches 77 (FIGS. 5–8) that open outward at opposite sides of the part 71. These notches may be generally V-shaped or generally U-shaped for receiving two elongated spaced parallel rod or track members 79 that are fixedly secured on the support 57. Each of the rod members 79 is provided with an enlarged head portion 81 at one external end thereof. A locking cap member 83 is disposed at the opposite end of each of the rod members 79 whereby the members 79 are fixedly secured on the end walls 63 of the member 57. The handle member 69 is mounted in position on the support 57 during assembly when the rod members or track members 79 are positioned in the notches 75, 77 and fixedly mounted in position to capture the member 69 on the support 57. During the mounting operating, sealing members 85 (FIGS. 7 and 8) may be mounted between the upper part of the handle member part 71 and the part 59 of the support. 57. The handle member 69 is supported for rectilinear sliding movement on the tracks or rod members 79.

A rigid metallic flat interlock member 87 is supported for compound movement on the internal main body part 71 of the handle member 69. A supporting post member 89 is rotatably supported in a suitable opening on the member 69. The post 89 is provided with a generally flat surface 90. The interlock member 87 is provided with an opening which receives the post 89 and keys with the flat surface 90 so that the member 87 will rotate with the post 89. A compression spring 91 is supported on the post 89 between the interlock member 87 and a spring support 91 that is fixedly secured to the post 89. The opening in the interlock member 87 is large enough to receive the post 89 loose enough that the member 87 can move in a general axial direction on the post 89 which motion can also be considered as a generally pivotal motion about the inner end part 93 (FIG. 8) that engages the handle member 69. The movement of the member 87 under the bias of the compression spring 91 is movement along a plane that is parallel to the plane of the paper as seen in FIG. 8. An elongated slot 97 (FIG. 6) is provided in one side wall 61 of the support 57 and the interlock member 87 protrudes out through this slot. The slot 97 is narrow at one end and when the handle member 69 is in the position disclosed in FIGS. 4–7, the upper edge 101

Figure 7:
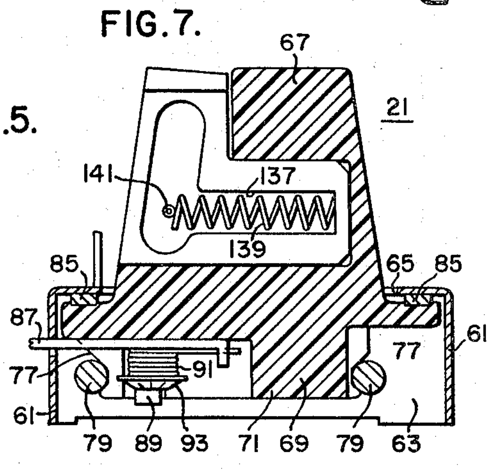
FIG. 7 is a sectional view taken generally along the line VII—VII of FIG. 5.
Figure 8:
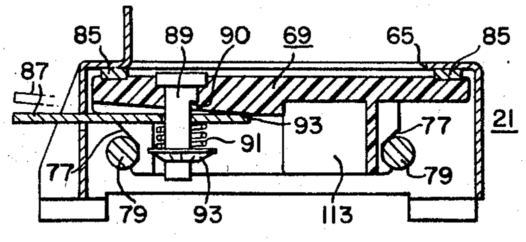
FIG. 8 is a sectional view taken generally along the line VIII—VIII of FIG. 5.

(FIG. 6) engages the interlock member 87 to limit movement of the interlock member 87 under the bias of the compression spring 91 (FIGS. 7 and 8).

Figure 4:
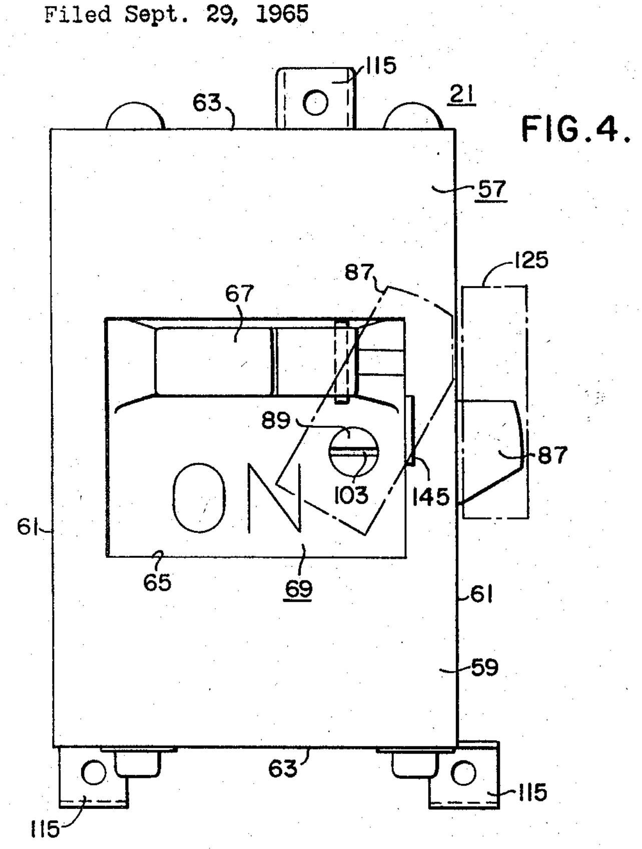
FIG. 4 is a top plan view of the handle operating attachment seen in FIG. 2.
Figure 6:
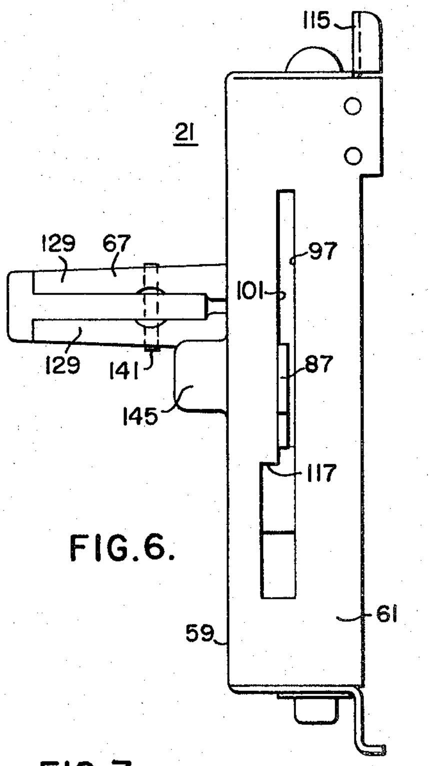
FIG. 6 is a side elevational view of the handle operating attachment seen in FIG. 4.
Figure 5:
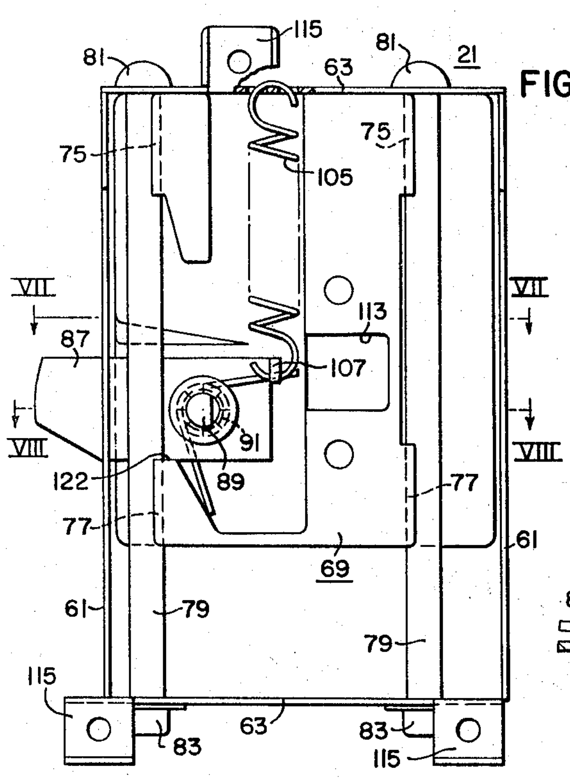
FIG. 5 is a bottom plan view of the handle operating attachment seen in FIG. 4.

As was hereinbefore set forth, the interlock member 87 is also keyed on the rotatable post 89 so that the member 87 can rotate in the plane of the paper as seen in FIGS. 4 and 5. As is seen in FIG. 4, the outer part of the post 89 is provided with a slot 103 therein for receiving a suitable tool such as a screwdriver. A tension spring 105 (FIG. 5) is secured at one end on the end wall 63 and at the other end on a spring support part 107 of the interlock member 87 to bias the interlock member 87 in a counterclockwise direction as seen in FIG. 5 which direction is clockwise as seen in FIG. 4. The inner main body part 71 of the handle member 69 is provided with a cavity 113 (FIGS. 5 and 8) for receiving the interrupter operating or handle 25 (FIG. 3) of the circuit breaker 19. The box-like support 57 of the handle operating attachment 21 is provided with three ear parts 115 with openings therein for receiving mounting bolts that may be used to mount the handle operating attachment 21 to the circuit breaker 19 (FIG. 2). The three ear parts 115 may be spaced differently and the handle operating attachment 21 can be adapted to utilize different types of mounting means that will enable the mounting of the attachment 21 to different types of circuit interrupters. In order to mount the handle operating attachment, the member is merely placed in position with the cavity 113 of the handle part 69 receiving the handle 25 (FIG. 3) of the circuit breaker 19 thereby providing an operative connection between the handle operating attachment 21 and the circuit breaker 19 merely by means of the mounting operation of the attachment 21 on the circuit breaker 19.

The operation will be best understood with reference to FIGS. 4 and 11–13. When the contacts of the circuit interrupter are open and the cover structure 7 is in the open position, the spring 91 (FIG. 8) biases the interlock 87 to the position seen in dot and dash lines in FIG. 8, which position is shown is FIG. 11. If an attempt is made to close the circuit interrupter with the cover structure 11 in the open position, the interlock 87 will engage a latch surface 117 on the support 57 to prevent movement of the handle member 69 to the "on" or closed-contact position. The interlock 87, during this operation, is prevented from rotating with the post 89 by engagement of the interlock 87 with a stop part 122 (FIG. 5) of the molded main body part 71.

Figure 12:
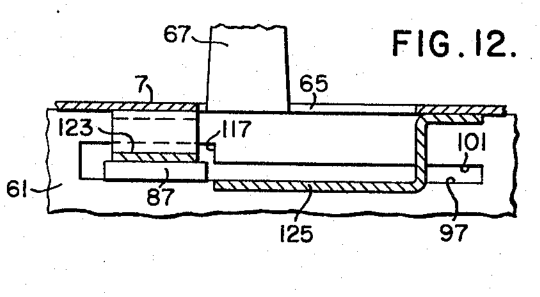

When the cover structure 7 is moved to the closed position seen in FIG. 12, a rigid projection 123 that is welded or otherwise fixedly secured to the inside of the cover engages the interlock 87 to move the interlock member 87 clear of the latch surface 117 against the bias of the spring 91 (FIG. 8). Thus, with the cover structure 7 in the closed position the circuit interrupting structure can be freely operated to the contact-opened and contact-closed positions.

Figure 13:
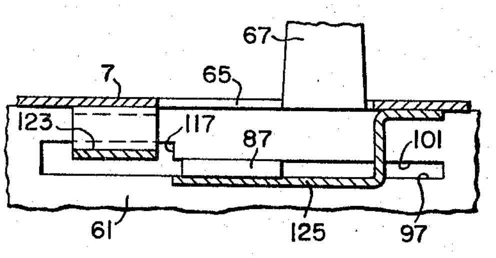

As can be seen in FIG. 13, when the cover structure is closed and the circuit interrupting structure is operated to the contact-closed or "on" position, the interlock member 87 is moved over a latch part or hook member 125 that is welded or otherwise fixedly secured to the inside of the cover. If an attempt is thereafter made to open the cover structure 7, the latch part 125 will engage the interlock member 87, which member 87 in turn engages the surface 101 (FIG. 11) of the handle operating attachment 31, to thereby prevent an opening operation of the cover structure 7 when the circuit interrupting structure is in the contact-closed or "on" position. As was previously described the post 89 and interlock member are rotatable. Thus, an authorized workman will understand that when it is desirable to defeat the interlock to permit opening of the cover structure 7 when the circuit interrupting structure is closed a suitable tool such as a screwdriver can be placed in the slot 103 (FIG. 4), and the post 89 and interlock 87 can be rotated against the bias of the spring 105 (FIG. 5) to the position, seen in dot and dash lines in FIG. 4, wherein the interlock member 87 is clear of the latch part 125. While the interlock 87 is held in the defeated position against the bias of the spring 105 with one hand, a worker, with the other hand, can move the cover structure 7 toward the open position clear of the interlock member 87.

Figure 11:
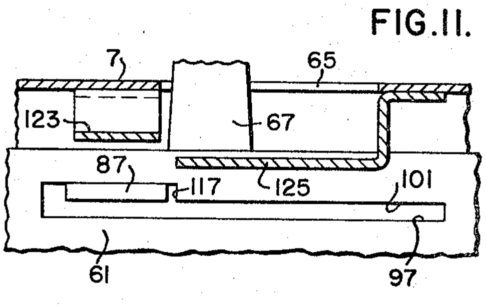
FIGS. 11–13 are schematic views illustrating various operating positions of parts of the handle operating mechanism and cover structure seen in FIG. 2.

When the cover structure 7 is in the open position and the interlock 87 is in the latching position seen in FIG. 11, it can be understood that the interlock 87 is accessible so that an authorized workman will realize that the member can be manually depressed clear of the latch surface 117 to permit a manual closing operation of the circuit interrupting structure when the cover structure 7 is in the open position.

Figure 9:
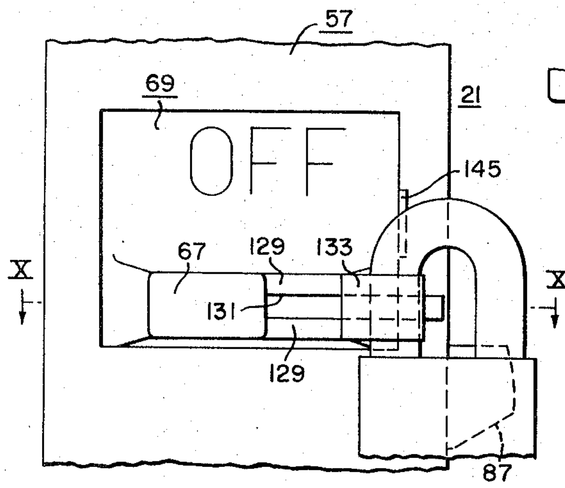
FIG. 9 is a top plan view of part of the operating handle attachment seen in FIG. 4, with the handle being shown padlocked in the "off" position.
Figure 10:
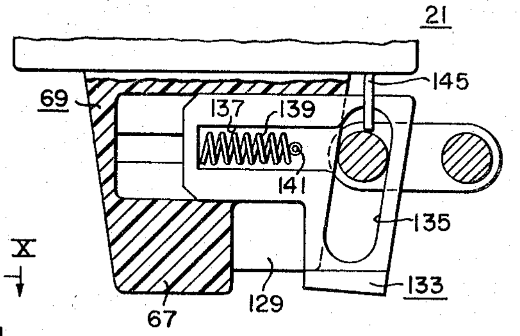
FIG. 10 is a sectional view taken generally along the line X—X of FIG. 9.

Referring to FIGS. 7, 9 and 10, it will be seen that the external part 67 of the molded insulating handle member 69 comprises two side wall parts 129 (FIGS. 6, 9 and 10) forming a slot 131 (FIG. 9) therebetween. A metallic padlock member 133, having a padlock-receiving opening 135 therein, is supported on the handle part 67 substantially in the slot 131. The padlock member 133 is provided also with spring retaining slot 137. During the mounting operation of the padlock member 133 on the handle part 67, a compression spring 139 is mounted in the slot 137 of the member 133, and the parts are moved into the position shown in FIG. 7 with the spring 139 being retained in place between the side walls 129 (FIG. 9) of the handle part 67. Thereafter, a spring-retaining pin 141 (FIGS. 6, 7 and 10) is fixedly mounted on the handle part 67. The compression spring 139 is biased against the pin 141 and the end part of the slot 137 to move and retain the padlock member 133 in the position seen in FIGS. 6 and 7 wherein the member 133 is mounted generally within the slot 131 (FIG. 9) of the handle part 67. The box-like support 57 is provided with a metallic rigid projection 145 (FIGS. 9 and 10) that is bent over from the top part 59 of the support. When it is desired to padlock the circuit interrupting structure in the "off" position seen in FIGS. 9 and 10, the padlock member 133 is pulled out against the bias of the spring 139 and padlocked in the outer latching position where the projection 145 interferes with the member 133 to prevent rectilinear operating movement of the handle member 69. The circuit interrupting structure may also be padlocked in the "on" position since the padlock member 133 can be pulled out and padlocked on the opposite side of the projection 145 to prevent rectilinear movement of the handle operating member 69 to the "on" position. The slot 135 in the padlock member 133 is large enough to receive a plurality of padlock hasps.

Figure 14:
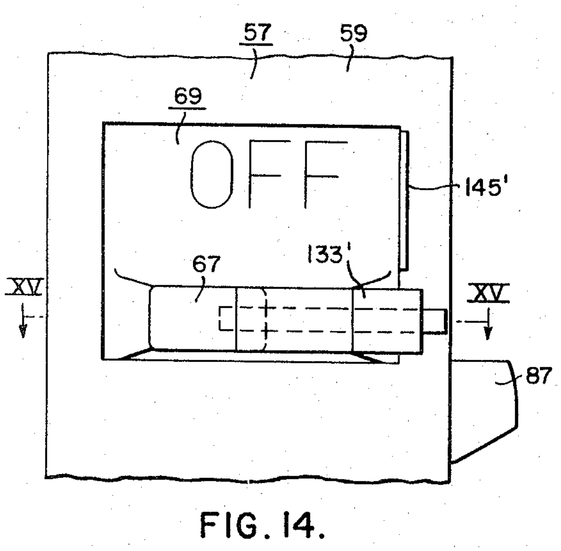
FIG. 14 is a partial top plan view illustrating a modified form of the invention.
Figure 15:
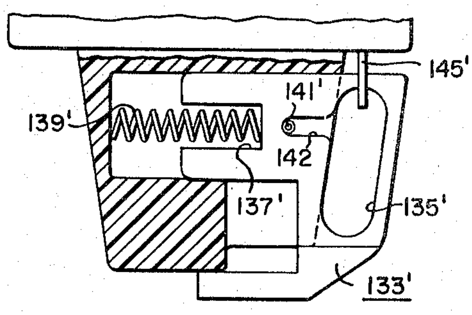
FIG. 15 is a partial sectional view taken generally along the line XV—XV of FIG. 14.

A modified form of the invention is disclosed in FIGS. 14 and 15 wherein those parts that are like the parts of FIGS. 9 and 10 are identified by the same reference characters as are used for the like parts in FIGS. 9 and 10. Certain parts in FIGS. 14 and 15 that are similar in some respects to the parts disclosed in FIGS. 9 and 10 are identified by primed reference characters the numerals of which are the same as the numerals of the similar parts in FIGS. 9 and 10. In FIGS. 14 and 15, a padlocking member 133′ is provided with a slot 137′ that is open at the inner end thereof, and a compression spring 139′ is disposed in the slot 137′ to bias the padlocking member 133′ outward toward the latching position. Outward movement of the padlocking member 133′ is limited by engagement of a retaining pin 141′ that is mounted on the handle part 67 and positioned in a slot 142 in the member 133′. The pin 141′ engages a part of the padlocking member 133′ at the end of the slot 142 and limits outward movement of the member 133′. The top part 59 of the box-like support 57 is provided with an upstanding projection 145′ that extends upward in a direction generally normal to the plane of the generally planar top part 59, which projection 145′ is longer than the projection 145 of the embodiment disclosed in FIGS. 9 and 10. In the embodiment disclosed in FIGS. 14 and 15, the padlocking member 133′ is moved automatically, by the bias of the spring 139′, into the latching or locking position during each operation of the circuit interrupting structure to the "off" position. If an attempt is made to operate the circuit interrupting structure to the "on" position the padlocking member 133′ will engage the projection 145′ to prevent movement to the "on" position. Thus, an operator must depress the padlocking member 133′ inward to clear the projection 145′ before operating the circuit interrupting structure to the "on" position. The padlocking member 133′ will be automatically retained in the unlatching position when the circuit interrupting structure is "on" because of the engagement of the member 133′ with the elongated upstanding projection 145′ that is positioned adjacent the padlocking member 133′ when the circuit interrupting structure is in the "on" position. The padlocking member 133′ can be padlocked in the latching position seen in FIGS. 14 and 15 in the same manner described with reference to FIGS. 9 and 10.

From the foregoing, it can be understood that there is provided by this invention an improved circuit interrupting structure comprising a circuit interrupter and a unitary handle operating mechanism that is removably secured to the circuit interrupter. The circuit interrupter may be a standard molded case type circuit breaker or a standard type of switch. The handle operating mechanism comprises a handle operator that is supported for sliding rectilinear movement on a track structure comprising two elongated rod members that are mounted in a parallel spaced relationship on a support. The rectilinearly movable handle member is relatively easy to operate with a full arm pushing or pulling motion when the circuit interrupting structure requires increased force for manual operation. An intelocking member, that is mounted on the handle member for compound movement, operates automatically to defeatably latch an enclosure cover structure closed when the circuit interrupting structure is closed and to defeatably latch the circuit interrupting structure open when the cover structure is open. In one embodiment the circuit interrupting structure can be padlocked in either the "on" or "off" positions by means of a padlock member that is mounted generally within the external handle and that can be pulled out against the bias of a spring member to interfere with an upstanding projection that is rigid with the support. In a modified form of the invention, the padlocking member is mounted on the external handle and biased outward toward the latching position. The projection on the support is lengthened to engage the padlocking member to prevent movement of the padlocking member to the latching position when the circuit interrupting structure is in the "on" position. In this latter modification, the padlocking member is automatically forced to the latching position by the biasing spring when the padlocking member clears the projection during each operation of the circuit interrupting structure to the "off" position.

Since numerous changes may be made in the above-described constructions, and different embodiments of the invention may be made without departing from the spirit and scope of the invention, it is intended that all matter contained in the foregoing description or shown in the accompanying drawings be interpreted as illustrative and not in a limiting sense.

I claim as my invention:

1. A circuit interrupting structure adapted for use in an enclosure having an openable cover structure with an opening therein and a latch part thereon, said circuit interrupting structure comprising a pair of cooperable contacts, an operating mechanism movable to open and close said contacts, a handle operating means operatively connected to operate said operating mechanism, a handle member comprising a handle part for protruding through said opening in said cover structure when said cover structure is closed, said handle member being movable as a unit between a contact-open position and a contact-closed position to operate said operating mechanism to open and close said contacts, an interlocking member movably supported on said handle member, when said cover structure is open and said circuit interrupting structure is in the contact-open position said interlocking member operating automatically to prevent operation of said circuit interrupting structure to the contact-closed position, said interlocking member being engageable by said cover structure when said cover structure is moved to the closed position whereupon said interlocking member will be automatically moved to an unlatching position to permit free operation of said circuit interrupting structure between the contact-open and contact-closed positions, when said cover structure is closed and said circuit interrupting structure is operated to the contact-closed position said interlocking member being automatically positioned in a latching position to engage said latch part of said cover structure to prevent opening of said cover structure.

2. A circuit interrupting structure adapted for use in an enclosure having an openable cover structure with an opening therein and a latch part thereon, said circuit interrupting structure comprising a pair of cooperable contacts, an operating mechanism movable to open and close said contacts, a handle operating means operatively connected to operate said operating mechanism, a handle member comprising a handle part for protruding through said opening in said cover structure when said cover structure is closed, said handle member being movable as a unit between a contact-open position and a contact-closed position to operate said operating mechanism to open and close said contacts, an interlocking member movably supported on said handle member, when said cover structure is open and said circuit interrupting structure is in the contact-open position said interlocking member operating automatically to prevent operation of said circuit interrupting structure to the contact-closed position, said interlocking member being engageable by said cover structure when said cover structure is moved to the closed position during which movement said interlocking member will be automatically moved to an unlatching position to permit free operation of said circuit interrupting structure between the contact-open and contact-closed positions, when said cover structure is closed and said circuit interrupting structure is operated to the contact-closed position said interlocking member being automatically positioned in a latching position to engage said latch part of said cover structure to prevent opening of said cover structure, said circuit interrupting structure comprising defeating means accessible through said opening in said cover structure when said cover structure is in the closed position, said defeating means being operable to move said interlocking member to a nonlatching position clear of said latch part of said cover structure to thereby permit opening of said cover structure when said enclosed circuit interrupting structure is in the contact-closed position.

3. A circuit interrupting structure adapted for use in an enclosure having an openable cover structure with an opening therein and a latch part thereon, said circuit interrupting structure comprising a pair of cooperable contacts, an operating mechanism operable to open and close said contacts, a handle operating means operatively connected to operate said operating mechanism, said handle operating means comprising a handle member comprising a handle part for protruding through said opening in said cover structure when said cover structure is closed, said handle member being rectilinearly movable between a contact-open position and a contact-closed position to open and close said contacts, a supporting post supported on said handle member, an interlocking member supported for movement on said supporting post, said circuit interrupting structure comprising a latch surface, when said cover structure is in the open position and said circuit interrupting structure is in the contact-open position said interlocking member engaging said latch surface to prevent operation of said circuit interrupting structure to the contact-closed position, when said circuit interrupting structure is in the contact-open position and said cover structure is moved to the closed position said interlocking member being engaged by said cover structure and being moved relative to said post to an unlatching position to permit free operation of said circuit interrupting structure between the contact-open and contact-closed positions, when said cover structure is in the closed position and said circuit interrupting structure is in the contact-closed position said interlocking member being positioned to effect latching engagement with said latch part to prevent opening of said cover structure.

4. A handle operating mechanism adapted for use with a circuit interrupter to provide a circuit interrupting structure adapted for use in an enclosure having an openable cover structure with an opening therein and a latch part thereon, said handle operating mechanism comprising a support having a handle opening therein, a handle member comprising a handle part for protruding through said opening in said cover structure when said cover structure is closed, said handle member being supported for generally rectilinear movement on said support, said handle member comprising a main body part on the inner side of said support and a handle extending through said handle opening to the outer side of said support, an interlocking member supported for movement on said handle member, said support comprising a latch surface, when said cover structure is in the open position and said handle member is in the contact-open position said interlocking member engaging said latch surface to prevent movement of said handle member to the contact-closed position, when said cover structure is moved to the closed position with said handle protruding through said opening in said cover structure and with said handle member in the contact-open position said cover structure engaging said interlocking member and moving said interlocking member clear of said latch surface whereby said handle member is freely operable between the contact-open and contact-closed positions when said cover structure is in the closed position, when said cover structure is in the closed position and said handle member is in the contact-closed position said interlocking member cooperating with said latch part to prevent opening movement of said cover structure, and defeating means accessible through said opening in said cover structure when the cover structure is in the closed position and operable to move said interlocking member to an unlatching position whereby said cover structure can be opened with said handle member in the contact-closed position.

5. A circuit interrupting structure adapted for use in an enclosure having an openable cover structure with an opening therein and a latch part thereon, said circuit interrupting structure comprising a pair of cooperable contacts, an operating mechanism operable to open and close said contacts, a handle operating means operatively connected to operate said operating mechanism, said handle operating means comprising a handle member comprising a handle part for protruding through said opening in said cover structure when said cover structure is closed, said handle member being rectilinearly movable between a contact-open position and a contact-closed position to open and close said contacts, a support post supported for rotation about the axis thereof on said handle member, an interlocking member supported on said support post for rotation with said support post and for generally axial movement relative to said support post, said handle operating means comprising a latch surface, when said cover structure is in the open position and said circuit interrupting structure is in the contact-open position said interlocking member engaging said latch surface to prevent operation of said circuit interrupting structure to the contact-closed position, when said circuit interrupting structure is in the contact-open position and said cover structure is moved to the closed position said interlocking member being engaged by said cover structure and moved in a generally axial direction on said post to an unlatching position to permit free operation of said circuit interrupting structure between the contact-open and contact-closed positions, when said cover structure is in the closed position and said circuit interrupting structure is in the contact-closed position said interlocking member being positioned to effect latching engagement with said latch part to prevent opening of said cover structure, externally accessible defeating means, when said cover structure is in the closed position and said circuit interrupting structure is in the contact-closed position said externally accessible means being operable to rotate said post and said interlocking member to move said interlocking member to a position free from said latch part to permit an opening operation of said cover structure when said circuit-interrupting structure is in the contact-closed position.

6. A handle-operating mechanism for use with a circuit interrupter of the type comprising a pair of contacts and an interrupter operating member movable between operating positions to open and close said contacts, said handle operating mechanism comprising a support having an opening therein, a handle member supported on said support for generally rectilinear movement and comprising a main body part disposed on the inner side of said support and a handle part protruding through said opening to the outer side of said support, said handle member being movable between a contact-open position and a contact-closed position to operate said interrupter operating member to open and close said contacts, an interlock member supported on said main body part, a first spring means biasing said interlock member in a first direction to a first latching position, latch means on said support cooperating with said interlock member to prevent movement of said handle member to the contact-closed position when said interlock member is in said first latching position, said interlock member being movable in a second direction opposite said first direction against the bias of said first spring means to a first unlatching position clear of said latch means to permit movement of said handle member to the contact-closed position, said interlock member moving with said handle member to the contact-closed position, a second spring means biasing said interlock member on said support member in a third direction different from said first and second directions to a second latching position, defeating means externally accessible at said opening in said support, said defeating means being operable to move said interlocking member in a fourth direction opposite said third direction against the bias of said second spring means out of said second latching position.

7. A handle operating mechanism for use with a circuit interrupter of the type comprising a pair of contacts and an interrupter operating member movable to open and close said contacts, said handle operating mechanism comprising a support having a handle opening therein, a handle member supported for generally rectilinear movement on said support, said handle member comprising a main body part on an inner side of said support and a handle extending through said handle opening to the outer side of said support, a support post rotatably supported on said main body part, an interlock member supported on said support post for rotation with said support post and for generally axial movement relative to said support post, a first spring means biasing said interlock member in a generally axial direction on said support post toward a latching position, said support comprising a latch surface cooperating with said interlock member when said interlock member is in said latching position to prevent rectilinear movement of said handle member, said interlock member being movable in said generally axial direction against the bias of said first spring means to a nonlatching position to permit rectilinear operating movement of said handle member, a second spring means biasing said interlock member and said support post in a first rotating direction to a second latching position, means accessible at said opposite side of said support for rotating said support post and said interlocking member against the bias of said second spring means to a position wherein said second latching position is defeated.

8. An enclosure comprising a cabinet, an openable cover structure supported on said cabinet and having an opening therein, a circuit interrupting structure supported within said cabinet, said circuit interrupting structure comprising a circuit interrupter and a handle operating mechanism, said circuit interrupter comprising a pair of cooperable contacts and an interrupter operating member movable between operating positions to open and close said contacts, said handle operating mechanism comprising a support having an opening therein, a handle member supported for rectilinear back-and-forth movement on said support, said handle member being operatively connected to said interrupter operating member, said handle member comprising a main body part on the inner side of said support and a handle part protruding through said opening in said support to the outer side of said support, said main body part substantially closing the opening in said support in all positions of said handle member, said handle member being rectilinearly movable in a first direction to a contact-open position to open said contacts and in a second direction opposite from said first direction to a contact-closed position to close said contacts, a support post rotatably supported on said main body part, an interlocking member supported on said support post for rotation with said support post and for generally axial movement relative to said support post, a first spring means biasing said interlocking member in an axial direction toward a first latching position, a second spring means biasing said interlocking member and said support post in a rotating direction about the axis of said support post toward a second latching position, said cover structure comprising a latch part, said support comrising a latch surface, when said cover structure is in the open position and said handle member is in the contact-open position said first spring means biasing said interlocking member to said first latching position in which position said interlocking member engages said latch surface on said support to prevent movement of said handle member to the contact-closed position, when said cover structure is moved to the closed position means on said cover structure engaging said interlocking member and moving said interlocking member in a generally axial direction against the bias of said first spring means to a position clear of said latch surface whereupon said handle member is freely movable between the contact-open and contact-closed positions, when said handle member is in the contact-closed position said interlocking member being automatically positioned in latching engagement with said latch part on said cover structure to prevent opening of said cover structure, externally accessible means accessible when said handle member is in the contact-closed position and operable to rotate said support post and said interlocking member against the bias of said second spring means to a position wherein said interlocking member is clear of said latch part to permit opening of said cover structure when said handle member is in said contact-closed position.

9. A handle operating mechanism comprising a support having an opening therein, a handle member supported for rectilinear movement on said support, said handle member comprising a main body part positioned on the inner side of said support and a handle part extending from said main body part through said opening to the outer side of said support, said handle comprising a handle part and a padlocking part movably supported on said handle part, means biasing said padlocking part to a latching position, an elongated projection extending from said support, said handle member being movable between a contact-open and a contact-closed position, when said handle member is in the contact-closed position said padlocking member engaging said projection to limit movement of said padlocking member to a latching position whereupon said handle member is freely movable to the contact-open position, when said handle member is operated to the contact-open position said padlocking member moving off of said projection and said biasing means biasing said padlocking member automatically to a latching position wherein said padlocking member will engage said projection to prevent movement of said handle member to the contact-closed position, said padlocking member having an opening therein to receive the hasp of the padlock whereby said padlocking member can be padlocked in said latching position.

10. A handle-operating mechanism for use in an enclosure having an openable cover structure with an opening therein and a latch part thereon which handle-operating mechanism is adapted to operate a circuit interrupter that is mounted in said enclosure and that is of the type comprising a pair of contacts and an interrupter operating member movable between operating positions to open and close the contacts, said handle operating mechanism comprising a support having an opening therein, said support comprising means engageable with said circuit interrupter to support said handle operating mechanism on said circuit interrupter, a handle member comprising a main body part disposed on the inner side of said support, said handle member comprising a handle part protruding through said opening in said support to the outer side of said support opposite said inner side which handle part is adapted to protrude through said opening in said cover structure when said cover structure is closed, said main body part comprising means engageable with said interrupter operating member to operatively movable said interrupter operating member upon movement of said handle member being movable supported on said support and being movable as a unit between a contact-open position and a contact-closed position to operate said interrupter operating member to open and close said contacts, an interlocking member movably supported on said handle member, when said cover structure is open and said handle member is in the contact-open position said interlocking member operating automatically to prevent operation of said handle member to the contact-closed position, said interlocking member being engageable by said cover structure when said cover structure is moved to the closed position whereupon said interlocking member will be automatically moved to an unlatching position to permit free operation of said handle member between the contact-open and contact-closed positions, when said cover structure is closed and said handle member is operated to the contact-closed position said interlocking member being automatically positioned in a latching position in which latching position said interlocking member engages said latch part of said cover structure to prevent opening of said cover structure.

11. A handle-operating mechanism according to claim 10, said handle-operating mechanism closing said opening in said cover structure when said cover structure is in the closed position, said handle-operating mechanism comprising defeating means accessible through said opening in said cover structure when said cover structure is in the closed position, said defeating means being operable to move said interlocking member to a non-latching position clear of said latch part of said cover structure to thereby permit opening of said cover structure when said handle member is in the contact-closed position.

12. A handle-operating mechanism according to claim 11, said handle member being supported on said support for rectilinear back-and-forth movement between said contact-open and contact-closed positions.

13. A handle-operating mechanism according to claim 12, a support post rotatably supported on said main body part, said interlocking member being supported on said support post for rotation with said support post and for generally axial movement relative to said support post, a first spring means biasing said interlocking member in a generally axial direction on said support post toward said position wherein said interlocking member prevents operation of said handle member to the contact-closed position, and a second spring means biasing said interlocking member and said support post in a rotating direction about the axis of said support post toward said position wherein said interlocking member engages said latch part of said cover structure to prevent opening of said cover structure.

14. An enclosure comprising a cabinet, an openable cover structure supported on said cabinet and having an opening therein, said cover structure having a cover latch part thereon, a circuit interrupting structure comprising an insulating housing and a circuit-interrupter mechanism supported within said insulating housing, said circuit-interrupter mechanism comprising a pair of cooperable contacts operable between contact-open and contact-closed positions, a circuit-interrupter operating member protruding from said insulating housing to permit operation of said circuit-interrupter mechanism, a handle-operating mechanism comprising a support having an opening therein, a handle member supported on said support and comprising a main body part disposed on the inner side of said support and a handle part protruding through said opening to the outer side of said support, means mounting said support on said insulating housing, means operatively connecting said main body part of said handle member with said circuit-interrupter operating member, said handle member being movably supported on said support and movable as a unit to operate said circuit-interrupter operating member to thereby operate said contacts, said handle member being movable as a unit between a contact-open position and a contact-closed position, an interlocking member movably supported on said main body part of said handle member, said support comprising a handle member latch part, when said cover structure is open and said handle member is in the contact-open position said interlocking member automatically engaging said handle member latch part to prevent operation of said handle member to the contact-closed position, said cover structure engaging said interlocking member when said cover structure is moved to the closed position during which movement said interlocking member is automatically moved to an unlatching position to permit free operation of said handle member between the contact-open and contact-closed positions, in the closed position of said cover structure said handle-operating mechanism closing said opening in said cover structure and said handle part protruding out through said opening in said cover structure, when said cover structure is in the closed position and said handle member is operated to the contact-closed position said interlocking member being automatically positioned in a latching position to engage said cover latch part of said cover structure to prevent opening of said cover structure.

15. The apparatus according to claim 14, defeating means on the front side of said handle operating mechanism and accessible through said opening in said cover structure when said cover structure is in the closed position, said defeating means being operable to move said interlocking member to a non-latching position clear of said cover latch part of said cover structure to thereby permit opening of said cover structure when said handle member is in the contact-closed position.

16. The apparatus according to claim 15, and said handle member being supported on said support for rectilinear back-and-forth movement between said contact-open and contact-closed positions.

17. The apparatus according to claim 16, a support post rotatably supported on said main body part of said handle member, and said interlocking member being mounted on said support post for rotation with said support post to the positions latching and unlatching said cover structure, said interlocking member being movably supported to move axially relative to said support post to said positions latching and unlatching said handle member.

References Cited by the Examiner

UNITED STATES PATENTS

| | | | |
|---|---|---|---|
| 3,028,459 | 4/1962 | Norden | 200—50 |
| 3,229,056 | 1/1966 | Turnbull | 200—50 |
| 3,340,888 | 3/1966 | Rys et al. | 200—50 |

ROBERT K. SCHAEFER, *Primary Examiner.*

J. R. SCOTT, *Assistant Examiner.*